(12) United States Patent
Nemeth et al.

(10) Patent No.: US 8,254,207 B2
(45) Date of Patent: Aug. 28, 2012

(54) SYSTEM AND METHOD FOR SEISMIC DATA ACQUISITION

(76) Inventors: Geza Nemeth, Austin, TX (US); Robert Gray Moore, Austin, TX (US); Zoltan Csizmadia, Austin, TX (US)

( * ) Notice: Subject to any disclaimer, the term of this patent is extended or adjusted under 35 U.S.C. 154(b) by 290 days.

(21) Appl. No.: 12/235,057

(22) Filed: Sep. 22, 2008

(65) Prior Publication Data

US 2010/0074055 A1  Mar. 25, 2010

(51) Int. Cl.
  *G01V 1/22* (2006.01)
(52) U.S. Cl. ............... 367/76; 367/37; 367/177; 367/14; 367/77
(58) Field of Classification Search ................... 340/539; 367/14, 43, 76, 77, 178, 38, 20, 60, 117, 367/177; 702/6, 14, 15, 79, 11–13, 16, 179
See application file for complete search history.

(56) References Cited

U.S. PATENT DOCUMENTS

| | | | |
|---|---|---|---|
| 4,152,691 A | 5/1979 | Ward | |
| 4,320,472 A | 3/1982 | Fort | |
| 4,663,744 A * | 5/1987 | Russell et al. | 367/76 |
| 5,189,642 A | 2/1993 | Donoho et al. | |
| 5,379,025 A | 1/1995 | Tatom et al. | |
| 5,469,403 A | 11/1995 | Young et al. | |
| 5,724,241 A * | 3/1998 | Wood et al. | 702/14 |
| 5,771,170 A * | 6/1998 | Withers et al. | 702/16 |
| 6,188,962 B1 * | 2/2001 | Morgan et al. | 702/14 |
| 6,219,620 B1 * | 4/2001 | Park et al. | 702/14 |
| 6,353,577 B1 | 3/2002 | Orban et al. | |
| 6,671,222 B2 | 12/2003 | Wilson et al. | |
| 6,977,867 B2 | 12/2005 | Chamberlain | |
| 6,999,377 B2 * | 2/2006 | Burkholder et al. | 367/63 |
| 7,085,196 B2 | 8/2006 | Nemeth | |
| 7,194,512 B1 * | 3/2007 | Creemer et al. | 709/205 |
| 7,382,690 B2 | 6/2008 | Nemeth | |
| 2002/0169559 A1 | 11/2002 | Onyia et al. | |
| 2003/0128627 A1 * | 7/2003 | Iseli et al. | 367/60 |
| 2004/0267499 A1 * | 12/2004 | Barnes | 702/179 |
| 2005/0177310 A1 * | 8/2005 | Duncan et al. | 702/14 |
| 2005/0276162 A1 * | 12/2005 | Brinkmann et al. | 367/77 |

FOREIGN PATENT DOCUMENTS

| | | |
|---|---|---|
| JP | 02298775 | 10/2002 |
| WO | 98/12577 | 3/1998 |

* cited by examiner

*Primary Examiner* — Jack W Keith
*Assistant Examiner* — Daniel L Murphy
(74) *Attorney, Agent, or Firm* — Robert C. Kowert; Meyertons, Hood, Kivlin, Kowert & Goetzel, P.C.

(57) ABSTRACT

In various embodiments, seismic receivers may detect seismic energy and transmit digital signals representative of the seismic energy to an S-line interface module (SLIM) and/or a smart antenna module (SAM) for collection. A SLIM may be used to connect two or more seismic receivers together. A SAM may include a memory medium for storing digital signals from seismic receivers (e.g., received directly from the seismic receivers or received through a connection to a SLIM) and a wireless transmitter to transmit data stored on the memory medium. The SAM may further include a Global Positioning System (GPS) receiver for receiving and storing timestamps, clock data, and/or positional data relative to the seismic receivers. The timestamps, clock data, and/or positional data may be transmitted along with the digital signal data to an external source (e.g., a laptop) for analysis to detect characteristics of subterranean formations.

19 Claims, 12 Drawing Sheets

SYSTEM AND METHOD FOR SEISMIC DATA ACQUISITION

BACKGROUND

Seismic exploration may include delivering energy into the ground from an energy source (such as an explosion) and using various receivers (or "phones") deployed in a pattern to pick up the returning waves reflected or refracted off of various subterranean formations. These receivers may detect the returning waves and may convert the received energy into a signal to be transmitted to a nearby collection station. The receivers may be strung together in streamers and signals from different streamers may be delivered to different collection stations. It may be difficult, however, to collect data from the various collection stations to bring to a main station for analysis.

SUMMARY

In various embodiments, one or more seismic receivers may be coupled to and/or incorporated in a module such as an S-line interface module (SLIM) and/or a smart antenna module (SAM) for seismic data collection. Seismic receivers may detect seismic energy and transmit digital signals representative of the seismic energy to the SLIM and/or SAM for collection. In some embodiments, digital signals from each seismic receiver may be sent on a separate digital channel and/or may include identifying information to identify the seismic receiver sending the digital signal. A SLIM may be used to connect two or more seismic receivers together (e.g., by providing a common data collection point for the two or more seismic receivers). A SAM may include a memory medium for storing digital signals from seismic receivers (e.g., received directly from the seismic receivers or received through a connection to a SLIM) and a transmitter (e.g., a wireless transmitter) to transmit data stored on the memory medium to a data collector. In some embodiments, the SAM may store digital signals on the memory medium for an extended time (e.g., several hours, several days, etc.) prior to transmitting the stored data to a data collector. In some embodiments, the SAM may transmit the digital signals as they are collected (in real time) to the data collector. The data collector may be a main data collector (e.g., a truck-based mobile computer system) or may be a secondary data collector (e.g., a laptop) used to collect data from multiple sources (e.g., multiple SAMs) to provide to the main data collector. In some embodiments, the SAM may further include a Global Positioning System (GPS) receiver for receiving and storing timestamps, clock data, and/or positional data relative to the seismic receivers. The timestamps, clock data, and/or positional data may be transmitted along with the digital signal data to an external data collector for further analysis. In some embodiments, the components of the SLIM and/or SAM may be incorporated in each individual seismic receiver.

In some embodiments, digital signals from seismic receivers may be analyzed at a data collector to determine the presence and/or characteristics (e.g., density, size, composition, etc.) of subterranean formations. For example, an energy source may be imparted to the ground and the resulting reflections/refractions from subterranean formations may be detected by the seismic receivers and represented in digital signals sent to the SLIM and/or SAM. Data from the SLIM and/or SAM may be collected at a data collector for analysis. In some embodiments, a cable-less system may include a SAM connected to a SLIM connected to a streamer of one or more seismic receivers for collecting passive seismic events (e.g., micro-seismic events such as traffic noise or sea waves). After a period of time (such as several hours, several days, etc.) the SAM may be disconnected from the SLIM and brought to a data collector (which may not be on the recording site) and the data collector may collect the seismic data from the SAM (e.g., from a memory medium on the SAM) and other SAMs to form a composite record of data from the multiple SAMs. The digital signals from the seismic receivers may be analyzed, for example, for oil field exploration.

BRIEF DESCRIPTION OF THE DRAWINGS

A better understanding of the present invention may be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation By Reference

U.S. Pat. No. 7,085,196, titled "Method and Apparatus for Gathering Seismic Data", which was filed Dec. 7, 2001, whose inventor is Geza Nemeth is hereby incorporated by reference in its entirety as though fully and completely set forth herein.

U.S. Pat. No. 7,382,690, titled "Method and Apparatus for Gathering Seismic Data", which was filed Jun. 12, 2006, whose inventor is Geza Nemeth is hereby incorporated by reference in its entirety as though fully and completely set forth herein.

Figure 1A:
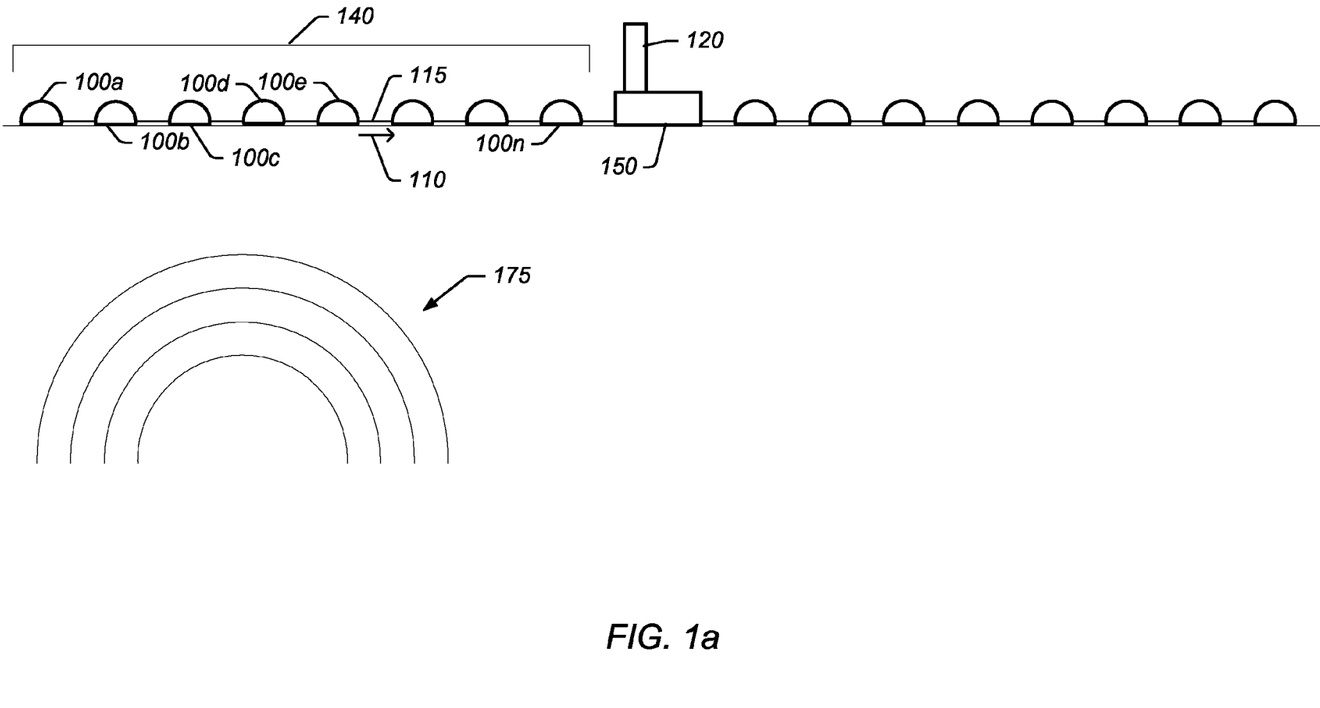
FIG. 1a illustrates a streamer of seismic receivers coupled to a SLIM and a SAM, according to an embodiment.
Figure 2:
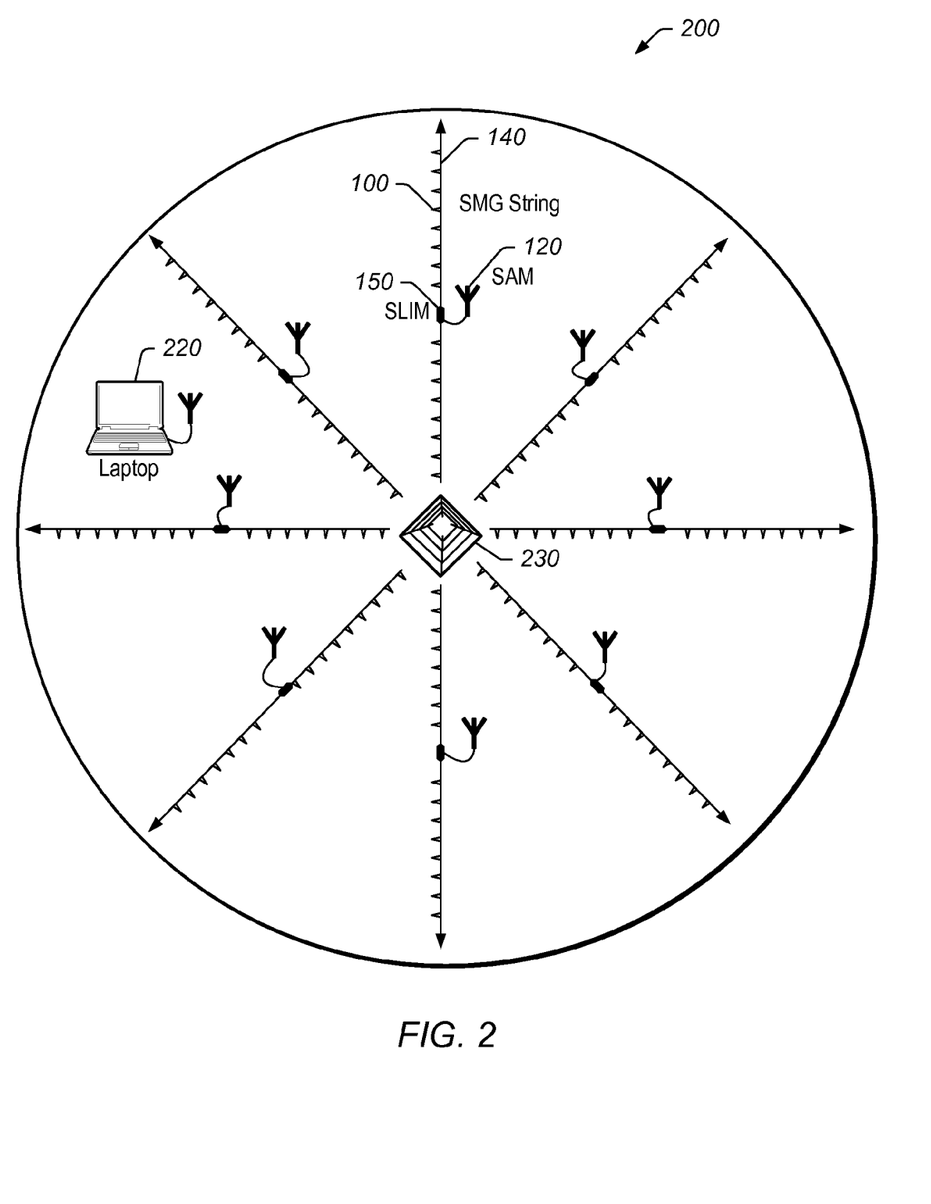
FIG. 2 illustrates a star configuration of seismic receivers coupled to respective SAMs, according to an embodiment.

FIG. 1a illustrates an embodiment of streamer 140 of seismic receivers 100a-n coupled to SLIM 150 and SAM 120. Seismic receivers 100 may detect seismic energy 175 and transmit digital representations (e.g., digital signals 110) of the detected seismic energy 175 to a module such as SLIM 150 and/or SAM 120. As used herein, "seismic receiver 100" is used to generally refer to a seismic receiver (such as one of seismic receivers 100a-n). SLIM 150 may be used to connect two or more seismic receivers 100 together (e.g., by providing a common data collection point (such as an Ethernet connector) connected to the two or more seismic receivers 100). In some embodiments, several streamers 140 may be daisy-chained together through SLIMs 150 placed between streamers 140. In some embodiments, SLIMs 150 may not include a cable connecting two or more SLIMs 150 (e.g., each SLIM 150 may be a stand-alone SLIM 150 connected to one or more seismic receivers 100 forming a streamer 140. SAM 120 may include memory medium 640 (e.g., see FIG. 6b) for storing digital signals 110 from seismic receivers 100 (e.g., received directly from seismic receivers 100 or received through a connection to SLIM 150) and transmitter 630 (e.g., a wireless transmitter) to transmit data stored on memory medium 640 to a data collector (e.g., data collector 220/230 as seen in FIG. 2). In some embodiments, SAMs 120 may interface with SLIMs 150 to store data from seismic receivers 100 connected to SLIMs 150. The data stored in SAM 120 may then be relayed to data collector 220/230. Other interfaces are also contemplated. In some embodiments, SAM 120 may store digital signals on the memory medium 640 for an extended time (e.g., several hours, several days, etc.) prior to transmitting the stored data to data collector 220/230. In some embodiments, SAM 120 may transmit the digital signals as they are collected (in real time) to data collector 220/230. In some embodiments, SAMS 120 may interface with data collector 220/230 directly (e.g., through a wired or wireless connection). In some embodiments, SAMs 120 may interface with seismic receivers 100 and data collectors 220/230 directly without interfacing with SLIMs 150.

In some embodiments, digital signals 110 from seismic receivers 100 may be transmitted to SLIM 150 and/or SAM 120 through a wired and/or wireless connection. Digital signals 110 from each seismic receiver 100 may include identifying information to identify seismic receiver 100 sending digital signal 110 (such that digital signals 110 from different seismic receivers 100 may be separately identified). In some embodiments, digital signals 110 from seismic receivers 100 may further include information about which streamer 140 the respective seismic receiver 100 is coupled to. In some embodiments, information (e.g., a digital address) about which seismic receiver 100 and/or which streamer 140 a particular digital signal 110 originates from may be added at SLIM 150 and/or SAM 120 (for example, seismic receivers 100 may transmit their digital signals 110 on different respective channels to SLIM 150 and/or SAM 120 which may store respective digital addresses with the respective digital signals 110). Other locations for the identifying information are also contemplated.

In some embodiments, digital signals 110 collected at SLIM 150 and/or SAM 120 may be provided (e.g., through a wired or wireless connection) to data collector 220/230 (e.g., a laptop or main data collector). In some embodiments, data may be provided to a first data collector 220 (such as a laptop) and then from the data collector 220 to a second data collector 230 (such as the main data collector). In some embodiments, information may be transmitted (e.g., wirelessly) directly from SAMs 120 to main data collector 230. Main data collector 230 may include a truck-based computer system operable to receive and analyze digital signals 110 from several streamers 140 in the field.

In some embodiments, other information may be transmitted from SLIM 150 and/or SAM 120 to data collector 220/230. For example, status information 675 such as which seismic receivers 100 are active, how many seismic receivers are attached, battery voltage/power, current data storage amount remaining, etc. may be transmitted from SLIM 150 and/or SAM 120 to data collector 220/230 in addition to digital signals 110 or separate from digital signals 110. For example, if bandwidth is limited, the status information 675 may be transmitted during data gathering (e.g., in real time) to detect real time problems and digital signals 110 may be collected later (e.g., by laptop (not in real time)). In some embodiments, real time digital signals 110 and/or status information 675 may be collected (e.g., wirelessly) by data collector 220/230 from SAMs 120 in a limited radius (e.g., to use in displaying for testing purposes, quality control, etc.) while data from other SAMs 120 may be collected at a later time. In some embodiments, data collector 220/230 may poll a specific SAM 120 for status information 675 and/or digital signals 110 for quality control during the data gathering. Data collectors 220/230 may also transmit control information to SAMs 120 and/or SLIMs 150 (e.g., through a wired connection and/or wireless connection). In some embodiments, digital signals 110 and status information 675 may be transmitted from all of SLIMs 150 and/or SAMs 120 in the field to main data collector 230 in real time. In some embodiments, SAMs 120 may transmit limited digital signals to data collector 220/230 in real time (e.g., for quality control) and the rest of the digital signals may be collected at a later time (e.g., not in real time).

In various embodiments, SAMs 120 and/or SLIMs 150 may communicate with each other and/or with data collectors 220/230 through wireless connections. For example, wireless communications may include wireless Ethernet communications or communications over a cellular network. Other wireless communications are also contemplated. In some embodiments, SAMs 120 and/or SLIMs 150 may be wired and/or physically coupled to data collectors 220/230 for communications. In some embodiments, data may be transmitted to data collector 220/230 through multiple SAMs 120. For example, data from one SAM 120 may be transmitted wirelessly to another SAM 120 which may then wirelessly transmit the data to data collector 220/230 (or, for example, to another SAM 120).

In some embodiments, digital signals 110 from seismic receivers 100 may be collected (e.g., from SLIMs 150 and/or SAMs 120) and analyzed (e.g., at data collector 220/230) to determine the presence and/or other characteristics (e.g., density, size, composition, etc.) of subterranean formations. For example, an energy source (such as a dynamite explosion, hammer, seismic vibrator, etc.) may be imparted to the ground and the resulting reflections/refractions from subterranean formations (e.g., seismic energy 175) may be detected by seismic receivers 100 and represented in digital signals 110 passed from seismic receivers 100 to SAMs 120 and then to data collector 220/230 to be analyzed with digital signals 110 from other seismic receivers 100. In some embodiments, the energy source may be imparted to the ground at different locations and digital signals 110 from seismic receivers 100 may be analyzed for the different locations. In some embodiments, seismic receivers 100 may be moved or kept in place between moving the energy source. In some embodiments, an energy source may not be provided (e.g., SAM 120 may record digital signals collected by seismic receivers 100 detecting seismic events (which may be micro-seismic events) generated, for example, by traffic noise or sea waves). By recording seismic events without bringing in a dedicated energy source (such as a heavy seismic vibrator and/or shooting crew), environmental damage to the recording site may be reduced. The analysis of digital signals 110 from seismic receivers 100 may be used, for example, in oil field exploration.

Figure 1B:
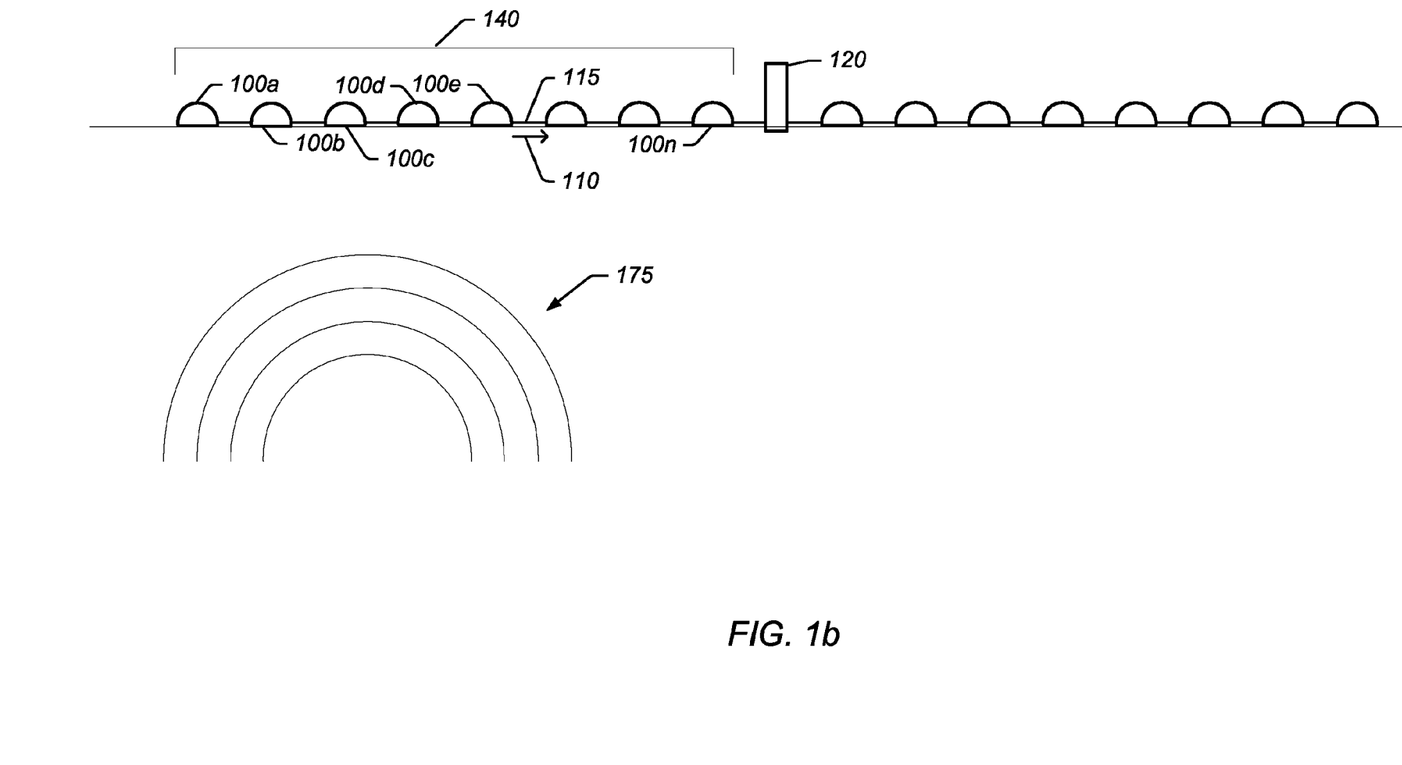
FIG. 1b illustrates a streamer of seismic receivers coupled to a SAM, according to an embodiment.

FIG. 1*b* illustrates an embodiment of streamer 140 of seismic receivers 100 coupled to SAM 120 without an intermediary SLIM 150. For example, connection functionality may be built into SAM 120 to allow SAM 120 to communicatively couple to one or more seismic receivers 100 (e.g., through wired or wireless connections).

Figure 1C:
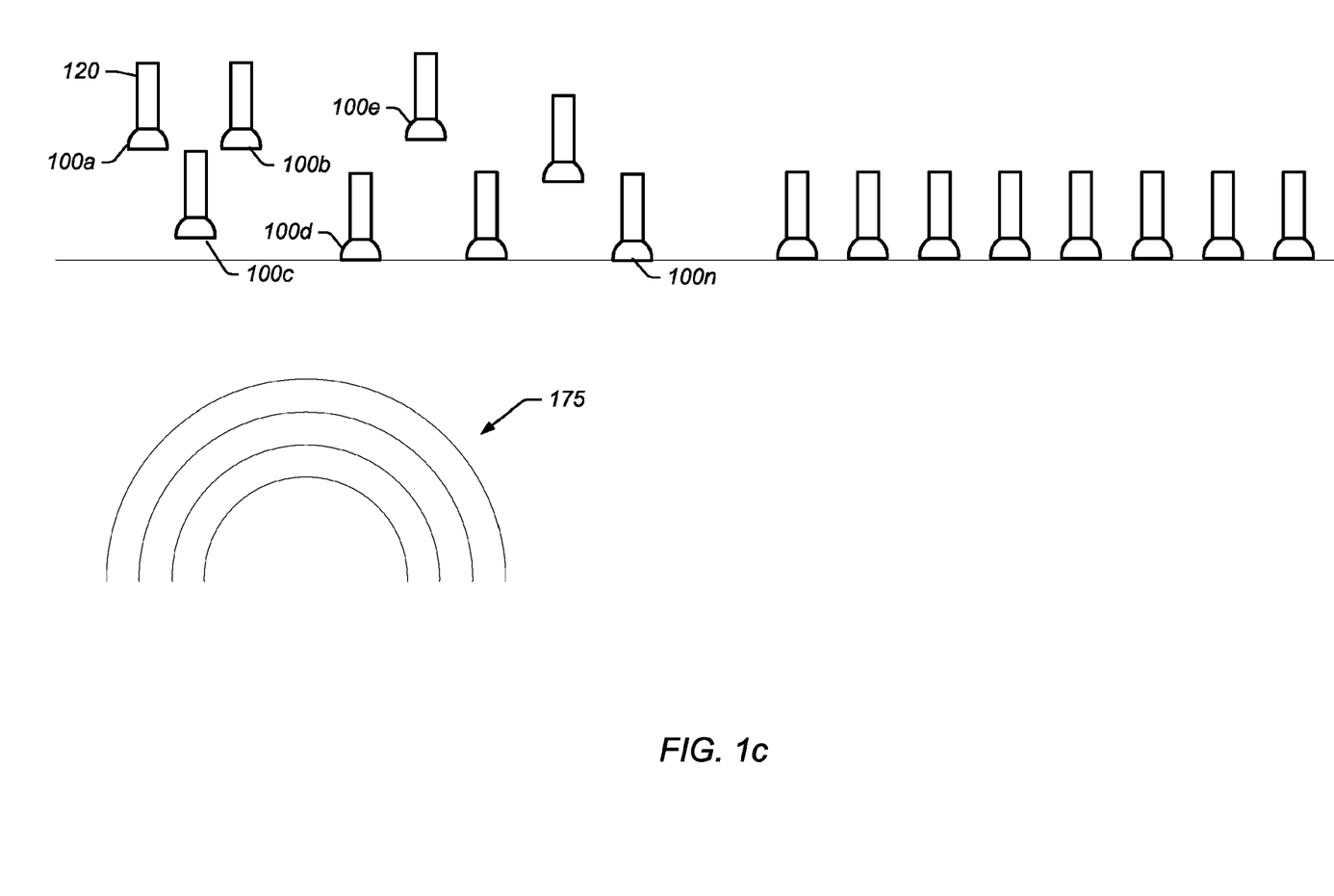
FIG. 1c illustrates seismic receivers with individual SAMs, according to an embodiment.

FIG. 1*c* illustrates embodiments of seismic receivers 100 with individual SAMs 120 (e.g., each seismic receiver 100 may have SAM 120 incorporated in seismic receiver 100 or may be attached to an individual SAM 120). SAM 120 may thus store digital signals 110 and/or status information 675 for the single seismic receiver 100 it is coupled to for transmission to data collector 220/230.

FIG. 2 illustrates an embodiment of star configuration 200 of seismic receivers 100 coupled to respective SAMs 120 (e.g., in an oil field). In some embodiments, streamers 140 may be laid out in the field in various patterns (e.g., star configuration 200). Digital signals 110 from seismic receivers 100 on streamers 140 may be sent to respective SLIMs 150 and/or SAMs 120 on streamers 140. In some embodiments, SLIMs 150 and/or SAMs 120 may be coupled to a fixed number (e.g., 12, 24, 36, 120, etc.) of seismic receivers 100. In some embodiments, SLIMs 150 and/or SAMs 120 may be coupled to different numbers of seismic receivers 100 (e.g., not a fixed number). For example, streamers 140 in the field may include varying numbers of seismic receivers 100.

In some embodiments, multiple streamers 140 may be coupled to the same SLIM 150 and/or SAM 120. For example, 36 seismic receivers 100 may be in streamer 140 on one side of SLIM 150 and 36 seismic receivers 100 may be in streamer 140 on the other side of SLIM 150 (for a total of 72 seismic receivers 100 coupled to SLIM 150). Other numbers of seismic receivers 100 and streamers 140 are also contemplated. Multiple streamers 140 may be coupled directly to the same SLIM 150 and/or SAM 120 and/or may be daisy-chained with other streamers 140 through SLIMs 150 and/or SAMs 120.

Figure 3:
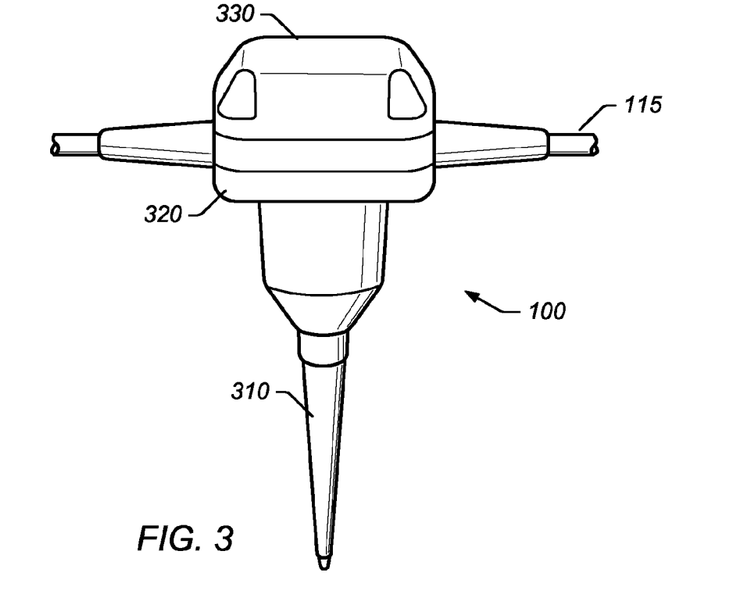
FIG. 3 illustrates an exterior of a seismic receiver, according to an embodiment.
Figure 4:
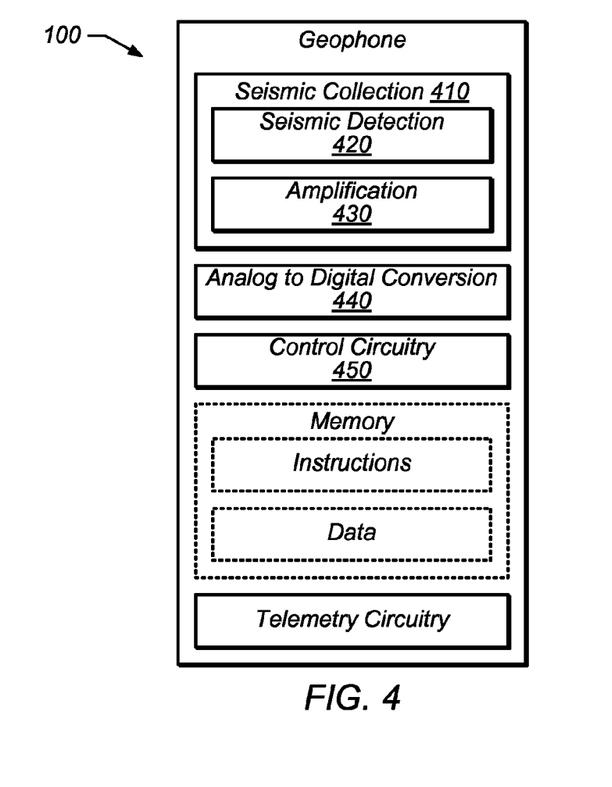
FIG. 4 illustrates a block diagram of a seismic receiver, according to an embodiment.

FIG. 3 illustrates an embodiment of the exterior of seismic receiver 100. Seismic receiver 100 may include securing base 310 (e.g., a spike to stick into the ground) and housing 320 for various sensors and circuitry. FIG. 4 illustrates a block diagram of the interior of seismic receiver 100, according to an embodiment. Seismic receiver 100 may include seismic collection circuitry 410 responsive to movements in a generally perpendicular direction with respect to the circuitry. In some embodiments, incoming seismic energy 175 may be detected at seismic detection circuitry 420 and may be amplified through amplification circuitry 430. Seismic receiver 100 may sample seismic energy 175 at 0.25, 0.5, 1, or 2 milliseconds (ms). Other sampling periods are also contemplated. In some embodiments, the amplified seismic signal may be transmitted to analog to digital converter 440 where the analog seismic signal may be converted to digital signal 110. In some embodiments, digital signal 110 may include a serial stream of information. In some embodiments, seismic receiver 100 may further include control circuitry 450 (e.g., a processor coupled to a memory with program instructions). In some embodiments, digital signal 110 may be sent from seismic receiver 100 upstream through a digital data controller, such as a UART (Universal Asynchronous Receiver-Transmitter) or USART (Universal Synchronous/Asynchronous Receiver/Transmitter). In some embodiments, digital signal 110 may be cached local to seismic receiver 100 and relayed in a "bundle", rather than in serial sequence as it is sampled and digitized. In some embodiments, multiple seismic receivers 100 may be coupled together (e.g., through wires 115). In some embodiments, seismic receivers 100 may have wireless transmitters to wirelessly transmit digital signals (e.g., to data collector 220/230). Digital signals 110 from seismic receivers 100 may also be transmitted (e.g., through a wired or wireless network) to SLIM 150 and/or SAM 120.

In some embodiments, controller circuitry 450 may modify parameters associated with data collection. For example, signals from the controller or processor may be used to drive switches to change a method of collection (e.g., the controller or processor may initiate the powering of a transistor that opens an alternative resistive path for the initial amplifiers on the front-end data collection such that the controller or processor may be used to change the initial amplification of the received seismic signal). In some embodiments, the controller or processor may be used to generate internal clocking signals. Clock signals that latch the analog data and the clock signals that time the transfer of data to the digital portion of seismic receiver 100 may be generated by seismic receiver 100. In some embodiments, power may be supplied to seismic receiver 100 through an external connection that may also be used to transmit digital signal 110 (e.g., to SLIM 150 and/or SAM 120). In some embodiments, top 330 of housing 320 may include a thicker plastic or rugged material (such as steel) to resist damage when seismic receiver 100 is pushed into the ground. In some embodiments, seismic receiver 100 may not be pushed into the ground. In some embodiments, housing 320 for seismic receiver 100 may be lightweight and/or waterproof.

Figure 5:
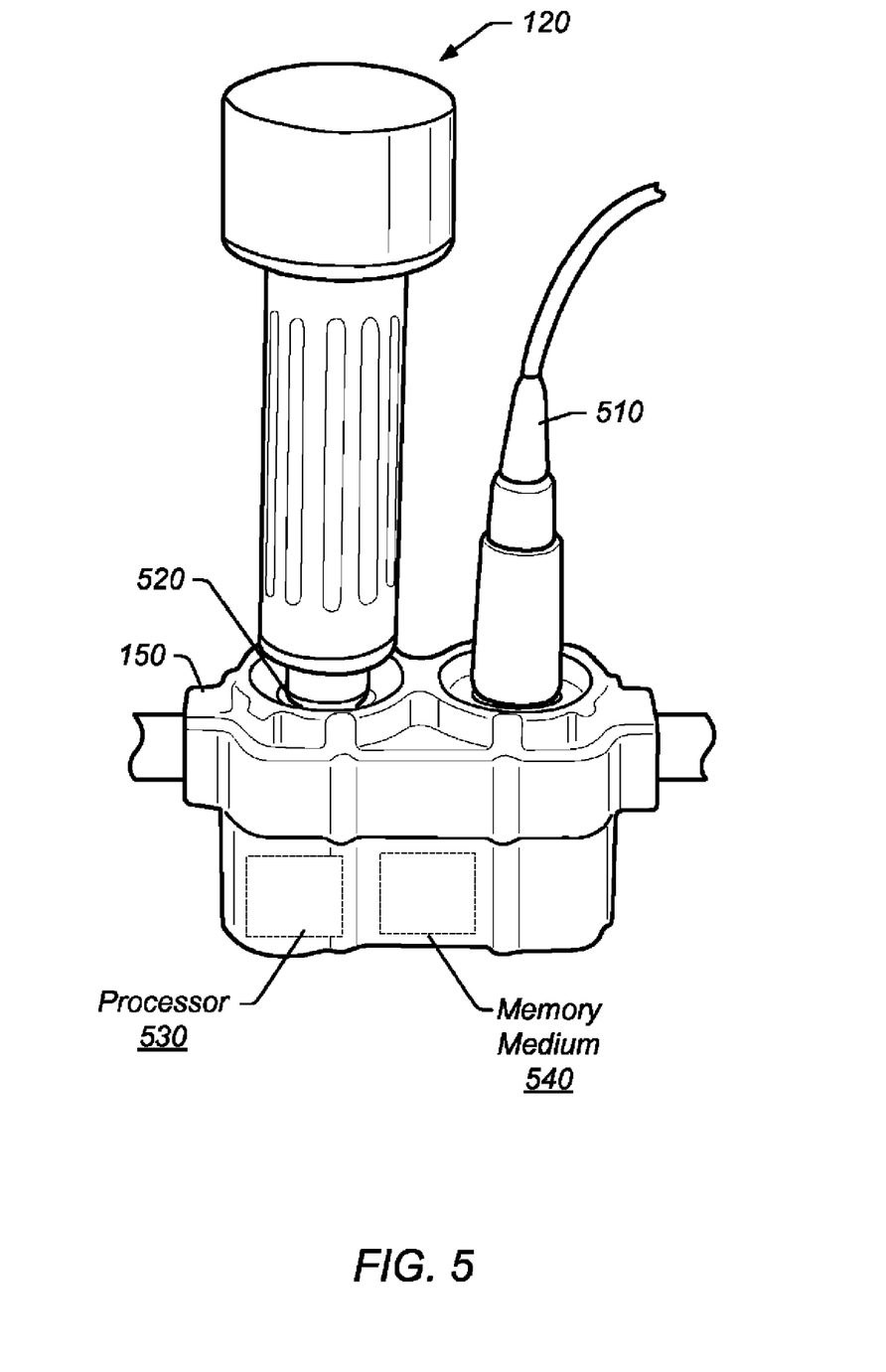
FIG. 5 illustrates a SLIM coupled to a SAM, according to an embodiment.
Figure 6A:
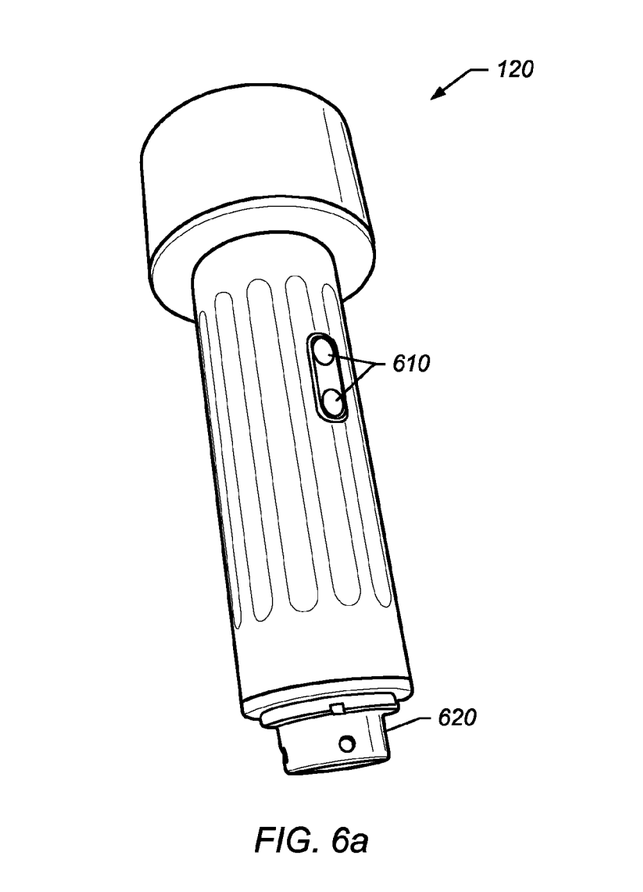
FIG. 6a-b illustrates a SAM exterior and a block diagram of interior components of the SAM, according to an embodiment.
Figure 6B:
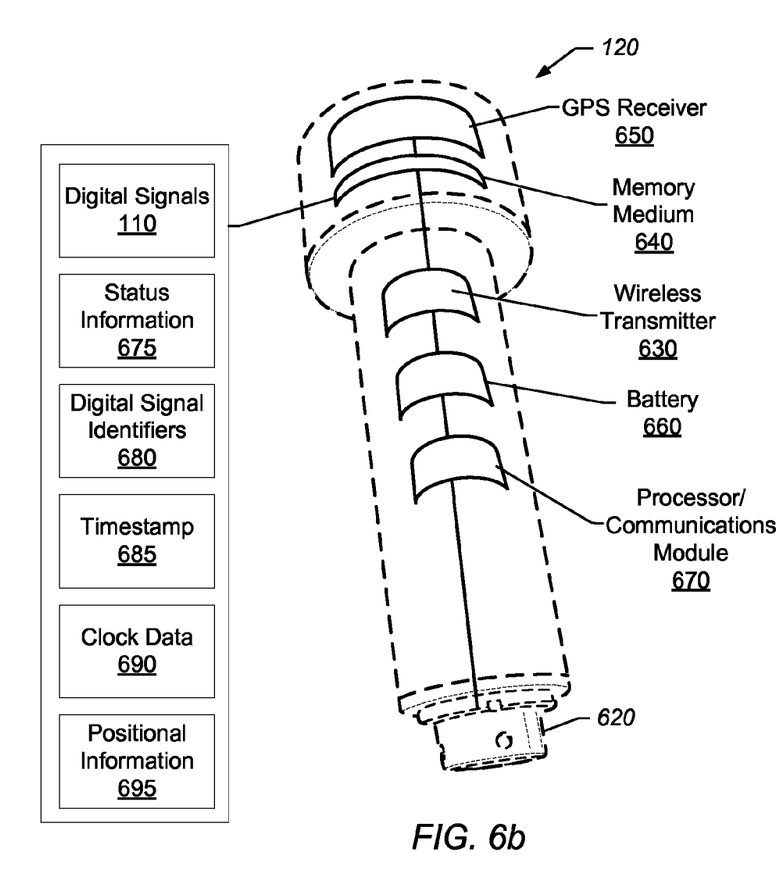

In some embodiments, seismic receivers 100 may be powered from an internal battery or from an external source. For example, power may be supplied to streamer 140 of seismic receivers 100 through cable 510 to SLIM 150 and wires 115 to respective seismic receivers 100 on streamer 140 coupled to SLIM 150. In some embodiments, SAM 120 may include internal battery 660 and/or may receive power from SLIM 150 (e.g., through connector 620). In some embodiments, internal battery 660 may be charged through power received from connector 620 when SLIM 150 is coupled to a power source (e.g., through cable 510). In some embodiments, each seismic receiver 100 may include SAM 120 and may receive power from battery 660. Other placements of the battery and other power sources (e.g., a solar cell) are also contemplated. In some embodiments, various functions of SAM 120 (e.g., communications, data processing, etc.) may be performed by processor 670.

FIG. 5 illustrates SLIM 150 coupled to SAM 120, according to an embodiment. In some embodiments, SLIM 150 may include a waterproof aluminum outer housing. FIGS. 6*a-b* illustrate a SAM exterior and a block diagram of interior components of SAM 120, according to an embodiment. In some embodiments, SAM 120 may include wireless transmitter 630 coupled to memory medium 640 (e.g., a flash card) for storing data received from seismic receivers 100 coupled to SAM 120 (e.g., through SLIM 150). In some embodiments, wireless transmitter 630 may wirelessly transmit the data stored on memory medium 640 to data collector 220/230. In some embodiments, data collector 220/230 may be a wireless collector capable of collecting wireless transmissions from multiple streamers 140 (e.g., from wireless transmissions from respective SAMs 120). For example, data collector 220/230 may include a laptop carried to each SAM 120 in the field. In some embodiments, memory medium 640 may be removable from SAM 120. For example, if memory medium 640 is a flash memory card, the flash memory card may be removed from SAM 120, inserted into the laptop for data transfer and then reinserted into SAM 120 for additional data collection. In some embodiments, SAMs 120 may be removed and connected to data collector 220 for data transfer or SAMs 120 may be collected and connected to main data collector 230 for data transfer. When SAM 120 is removed (e.g., to be brought to main data collector 230), another SAM 120 may be attached (e.g., to SLIM 150) in place of SAM 120 that was removed. In some embodiments, data may be wirelessly transmitted to data collector 220/230. In some embodiments, a wired connection may be made between SAM 120 and data collector 220/230. For example, the collected offline SAMs 120 (and/or memory mediums 640 of SAMs 120) may be connected to data collector 230 (which may include a transcriber unit) and data collector 230 may read the data stored on the offline SAMs 120 (and/or memory mediums 640) to form a composite record of the data from several SAMs 120. SAMs 120 may replace bulky and heavy line cables and a central recording system truck on site thus reducing environmental damage to the site (SAMs 120 may be brought offsite for connecting to data collector 220/230).

In some embodiments, SAM 120 may include connector 620 for receiving data (e.g., digital signals 110 received by a connected seismic receiver 100 and/or streamer 140, status information 675, etc.) from SLIM 150 (e.g., through connector 520 on SLIM 150). Connector 620 may be an Ethernet connector and SAM 120 and SLIM 150 may have an Ethernet connection through connector 620 and connector 520 for transferring data between SLIM 150 and SAM 120. Connector 520 on SLIM 150 may also be used to connect SLIM 150 through a cable connection to data collector 220/230 for data transfer. Data may be transferred from a memory medium 540 and/or for real time review of incoming digital signals 110. Real time review may be used, for example, to analyze digital signals 110 as they are collected, to field test seismic receivers 100 and/or streamers 140, etc. In some embodiments, data transmission speeds on Ethernet connector 620 may be approximately 100 Mbits/sec (other speeds are also contemplated). In some embodiments, digital signals 110 from seismic receivers 100 may be received at a slower rate at SLIM 150, and digital signals 110 may be stored (e.g., on memory medium 540) to be sent to SAM 120 or data collector 220/230 at a higher speed.

In some embodiments, connector 520 may also be used for programming SLIM 150. For example, connector 520 may also be used by SAM 120 (or, for example, a data collector 220/230) to program processor 530 on SLIM 150 (e.g., by providing various data collection configuration parameters (such as recording start and stop times), information about seismic receivers 100 connected to SLIM 150, etc). In some embodiments, connector 620 on SAM 120 may be used to program SAM 120 (e.g., program processor/communications module 670). In some embodiments, SLIM 150 and/or SAM 120 may be programmed wirelessly.

In some embodiments, SAM 120 may further include Global Positioning System (GPS) receiver 650. GPS receiver 650 may be used to receive positional information 695 on a location of SAM 120 (and correspondingly, seismic receiver 100 or streamer 140 SAM 120 is coupled to). GPS receiver 650 may also be used to receive and store timestamp 685 (e.g., from a GPS satellite corresponding to the time messages from the GPS satellite were sent) to store respective to the data from the seismic receivers 100 such that when the data is analyzed, timestamp 685 may provide a time reference for the data relative to data collected on different seismic receivers 100 or streamers 140 (which may also be associated with a timestamp received by their respective GPS receivers). In some embodiments, GPS receiver 650 may receive and store clock data 690 (e.g., from a GPS satellite) for use in synchronizing data collection in the seismic receivers 100 coupled to the SAM 120 with the data collection of other seismic receivers 100. In some embodiments, SAM 120 may display information to a user. For example, SAM 120 may include LEDs (Light Emitting Diodes) 610. LEDs may be used to indicate, for example, a GPS position lock, low battery, active data transfer, etc. In some embodiments, LEDs 610 may be covered by plastic or another material for protection in the field.

In some embodiments, SAM 120 may be incorporated into seismic receiver 100 such that seismic receiver 100 may include the components seen in FIG. 4 and FIG. 6b. In some embodiments, incorporated seismic receivers (e.g., see seismic receivers 100 in FIG. 1c) which include wireless transmitter 630 and battery 660 may be placed without the constraint of a cable between seismic receivers 100. In some embodiments, each seismic receiver 100 may include SAM 120 and may transmit their digital signals 110 to another SAM 120 (e.g., SAM 120 assigned to one or more streamers 140) or to a different data collector (e.g., a laptop or main data collection facility). In some embodiments, seismic receiver 100 may include a connector to receive power to recharge battery 660. In some embodiments, battery 660 may be replaceable.

Figure 7A:
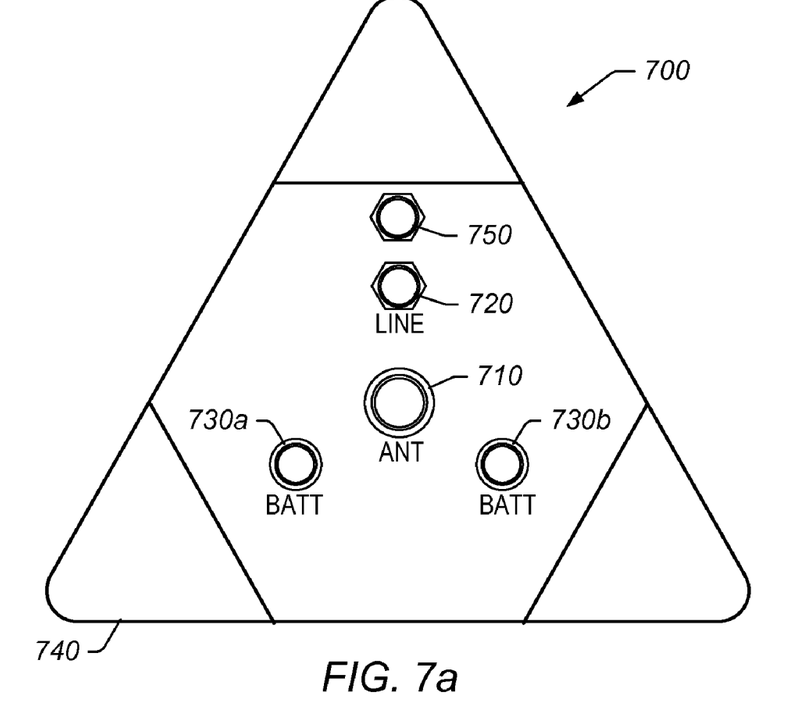
FIGS. 7a-b illustrates a SAM base, according to an embodiment.
Figure 7B:
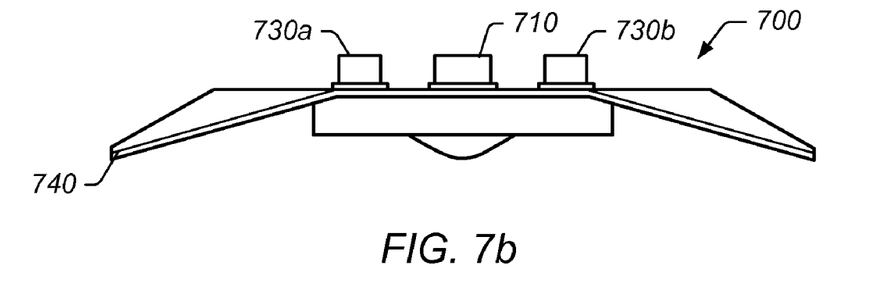
Figure 8:
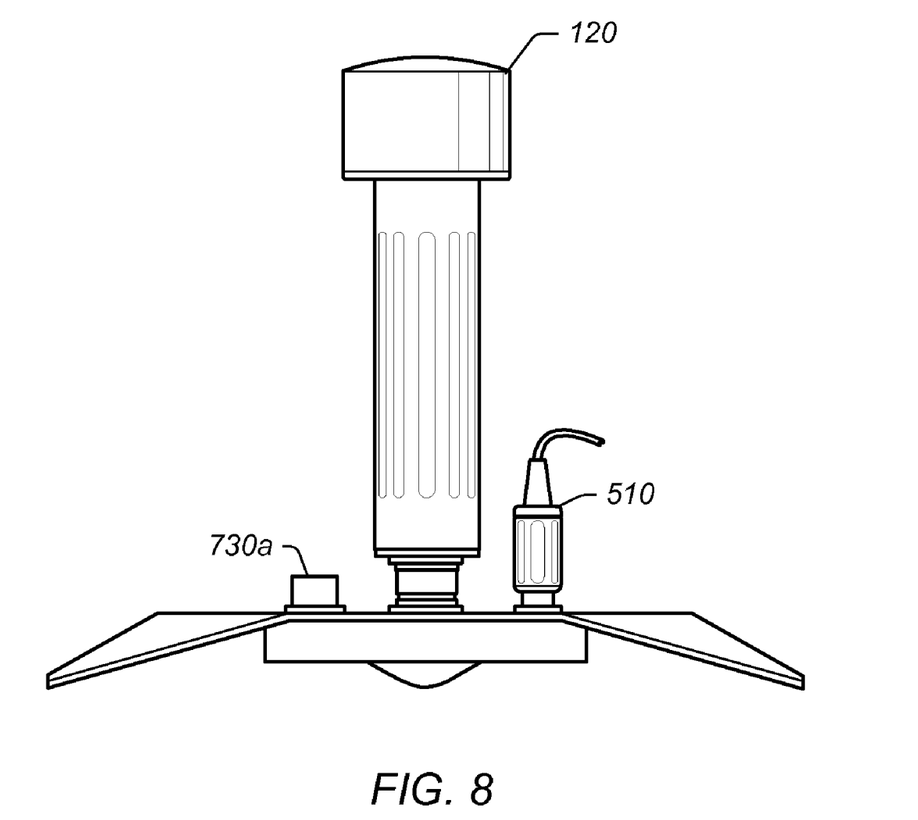
FIG. 8 illustrates a SAM base coupled to a SAM, according to an embodiment.

FIGS. 7a-b illustrate SAM base 700, according to an embodiment. In some embodiments, SAM 120 may be coupled to SAM base 700 which may or may not be connected to SLIM 150. Base 740 may be constructed, for example, of sheet metal and may include one or more connectors. Other materials for base 740 are also contemplated (e.g., plastic). SAM base 700 may include connector 710 for connecting to SAM 120 (e.g., see FIG. 8). SAM base 700 may further include connectors 720 for connecting to SLIM 150 and/or one or more seismic receivers 100. In some embodiments, connector 750 may be used to connect to an external device (e.g., a laptop) for real time review of digital signals 110 received by a connected seismic receiver 100 and/or streamer 140. In some embodiments, connector 720 and connector 750 may form a parallel receive pair for Ethernet connection (e.g., to SAM 120) and hook up to the Ethernet port (e.g., through connector 750) of a laptop computer, for example, to view a real time oscilloscope, energy monitor, etc. on the laptop while recording data to the SAM Flash memory (e.g., through connector 720). In some embodiments, real time data may be wirelessly transmitted (e.g., from transmitter 630) to, for example, the laptop for real time review. Real time review may include a bar graph representing the energies received by the respective seismic receivers 100 coupled to SAM base 700. Real time review may be used, for example, to field test seismic receivers 100 and/or streamers 140. In some embodiments, SAM base 700 may include battery connectors 730a-b. SAM base 700 may use battery connectors 730 to connect to an external battery(ies) or to connect to a source of power to charge internal battery 660 (e.g., through external power cable 510). In some embodiments, having two or more connectors to external batteries/power sources may allow SAM 120 and/or power sources to be hot swappable (as one connector provides power while the other connector's power source is swapped).

Figure 9:
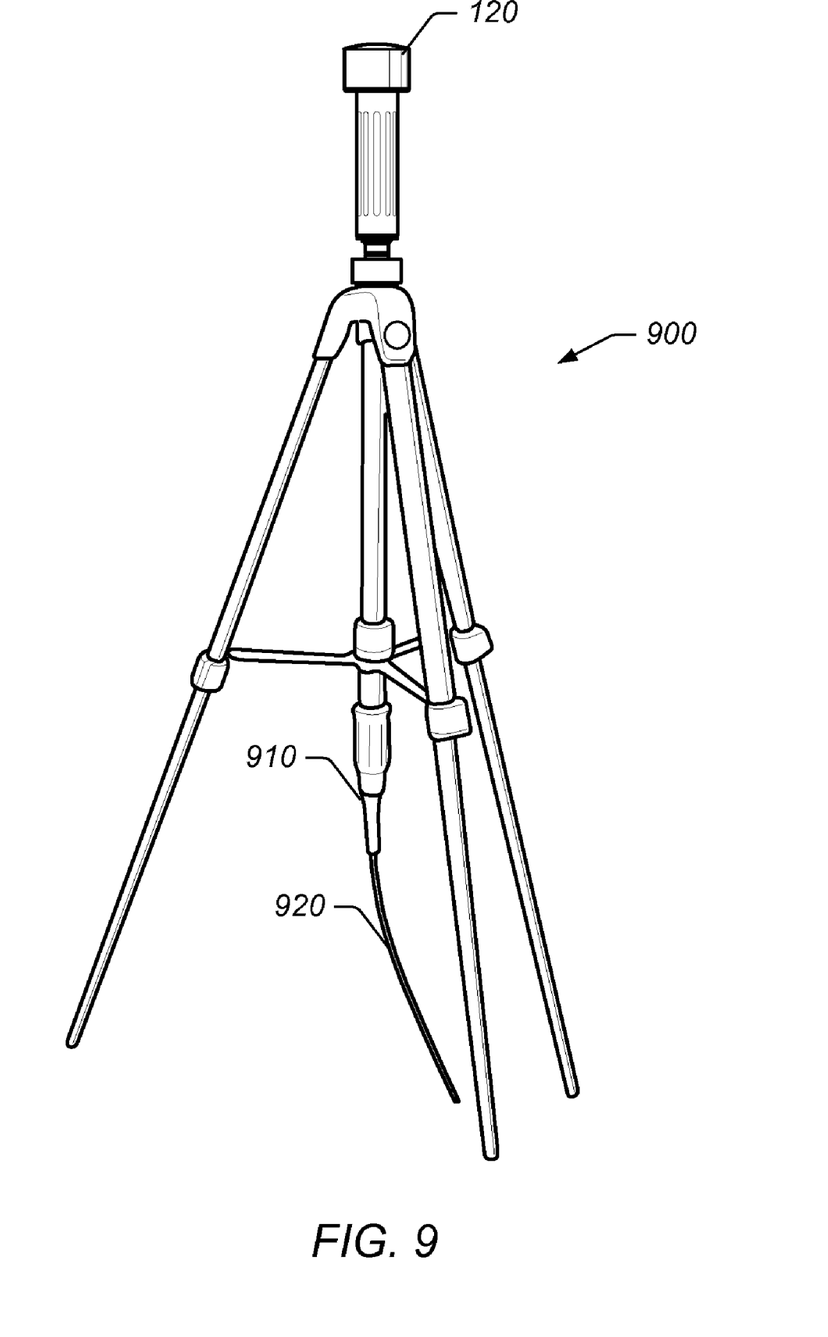
FIG. 9 illustrates a tripod for a SAM, according to an embodiment.

FIG. 9 illustrates tripod 900 for SAM 120, according to an embodiment. In some embodiments, connector 620 of SAM 120 may be coupled to tripod 900. SAM 120 may be further coupled to SLIM 150 through tripod connection 910 and data cable 920. Tripod 900 may make data collection and swapping out SAM 120 easier by allowing a user to interface with SAM 120 without needing to stoop down or bend their knees. Tripod 900 may also extend the wireless range of SAM 120.

Figure 10:
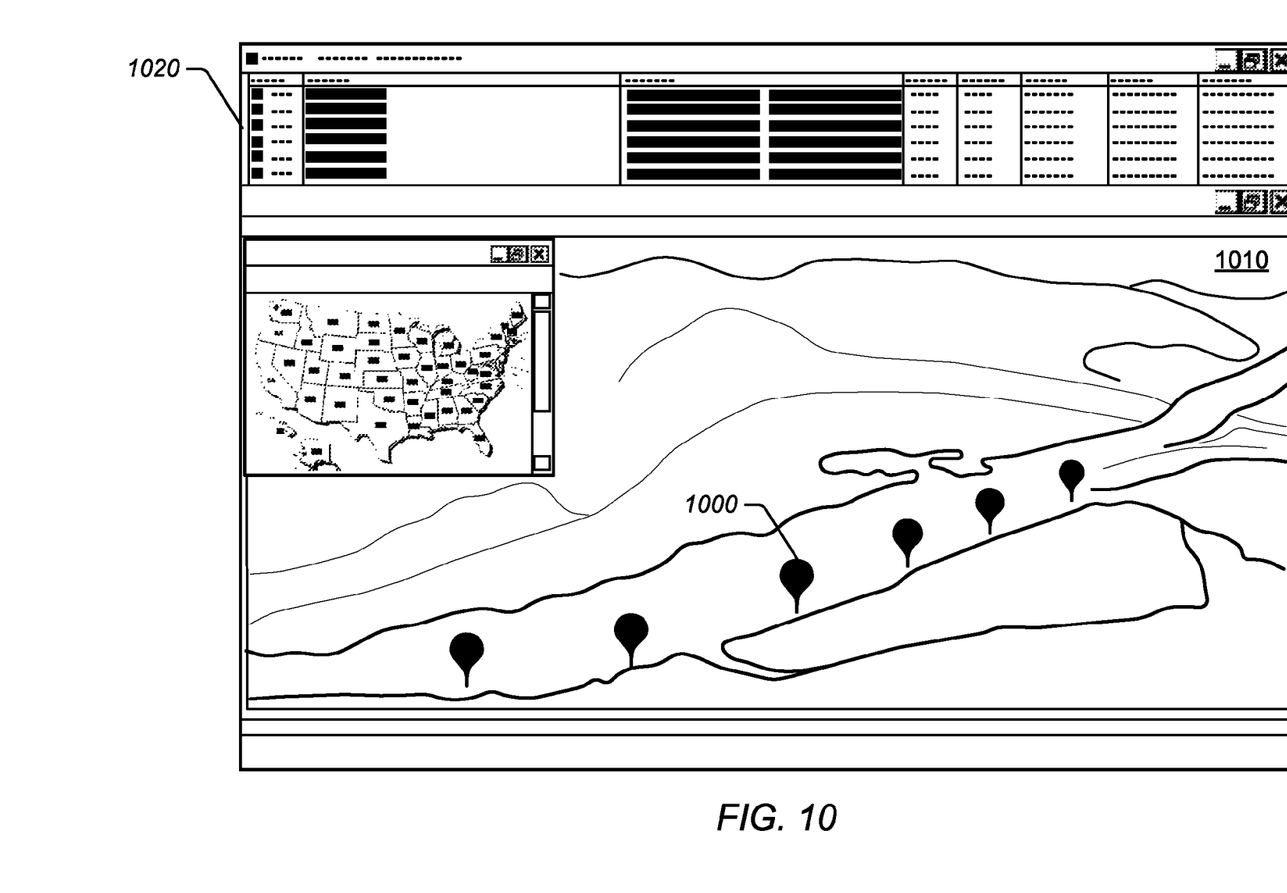
FIG. 10 illustrates a graphical interface presenting information gathered from SAMs, according to an embodiment.

FIG. 10 illustrates a graphical interface presenting information gathered from SAM 120, according to an embodiment. Through GPS positional data collected with digital signals 110, positions 1000 of SAMs 120 and the connected seismic receivers 100/streamers 140 may be displayed (e.g., on digital topographic map 1010). Positional information may be shown, for example, on a graphical user interface (GUI) of a laptop in the field to assist a user in locating seismic receivers 100 or assist in placement of seismic receivers 100/streamers 140 according to a predetermined pattern. Additional information 1020 (e.g., status information 675) may also be displayed relative to SAMs 120, seismic receivers 100, and/or streamers 140. In some embodiments, real time status information may be collected from SAMs 120 and displayed (e.g., seismic receiver status may be displayed in green for active and red for inactive). In some embodiments, the graphical interface/digital topographic map may be provided over the Internet (e.g., to a remote viewer).

Figure 11:
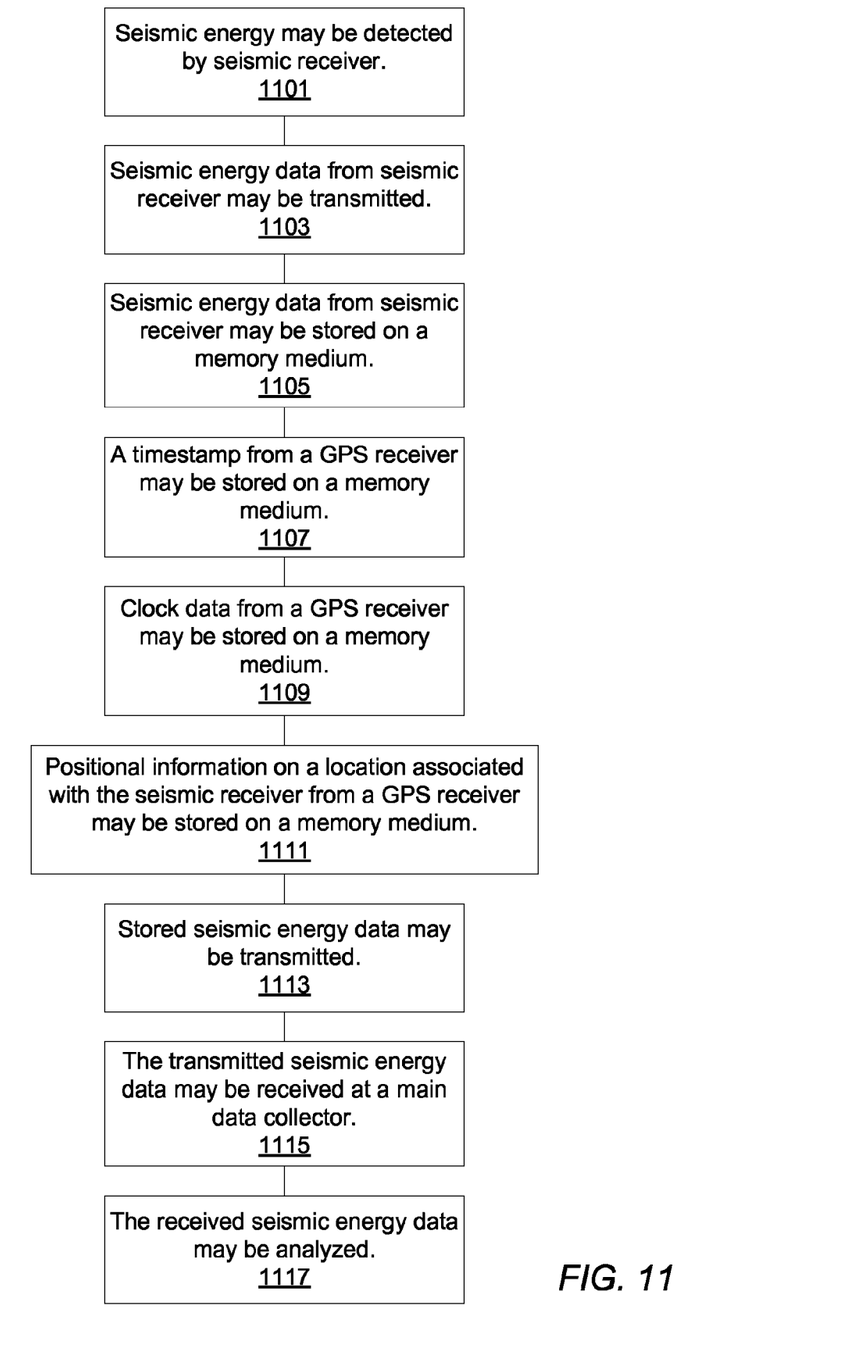
FIG. 11 illustrates a flowchart of a method for data collection using a SAM, according to an embodiment.

FIG. 11 illustrates a flowchart of a method for data collection using SAM 120, according to an embodiment. It should be noted that in various embodiments of the methods described below, one or more of the elements described may be performed concurrently, in a different order than shown, or may be omitted entirely. Other additional elements may also be performed as desired. In some embodiments, a portion or the entire method may be performed automatically.

At 1101, seismic energy 175 may be detected by seismic receiver 100 and seismic receiver 100 may generate digital signal 110 representative of the detected seismic energy 175.

At 1103, seismic energy data (e.g., in the form of digital signals 110) from seismic receiver 100 may be transmitted to SLIM 150 and/or SAM 120. Seismic receiver 100 may be coupled (physically or wirelessly) to streamer 140, SLIM 150, and/or SAM 120.

At 1105, seismic energy data (e.g., in the form of digital signals 110) from seismic receiver 100 may be stored on a memory medium in SLIM 150 and/or SAM 120. In some embodiments, seismic energy data from multiple seismic receivers 100 may be stored on a memory medium in SLIM 150 and/or SAM 120. In some embodiments, identifiers 680 (e.g., channel and/or seismic receiver identifiers) may be stored with the seismic energy data. For example, digital signals 110 from each seismic receiver 100 may be sent to SLIM 150 and/or SAM 120 on separate channels. SLIM 150 and/or SAM 120 may store digital signals 110 with respective channel identifiers 685. In some embodiments, digital signals 110 may include respective seismic receiver identifiers 685 and these seismic receiver identifiers 685 may be stored with digital signals 110.

At 1107, timestamp 685 from GPS receiver 650 may be stored on a memory medium in SLIM 150 and/or SAM 120. In some embodiments, timestamp 685 may be associated with seismic energy data received and stored for one or more seismic receiver 100 (e.g., for streamer 140 of seismic receivers 100 coupled to SLIM 150 and/or SAM 120).

At 1109, clock data 690 from GPS receiver 650 may be stored on a memory medium in SLIM 150 and/or SAM 120. In some embodiments, clock data 690 may be used to synchronize data collection from seismic receivers 100 with data collected from other seismic receivers 100. For example, data collector 220/230 may use clock data (and/or timestamp 685) stored with respective data from respective seismic receivers 100 and/or streamers 140 to synchronize data from multiple seismic receivers 100 and/or streamers 140 when being analyzed.

At 1111, positional information 695 on a location associated with seismic receiver 100 from GPS receiver 650 may be stored on a memory medium in SLIM 150 and/or SAM 120. For example, a latitude/longitude position of SAM 120 coupled to streamer 140 may be stored with data stored respective to streamer 140. In some embodiments, one or more seismic receivers 100 may include GPS receivers 650 and positional information 695 may be stored respective to the one or more seismic receivers 100.

At 1113, stored seismic energy data (e.g., represented as digital signals 110) may be transmitted (e.g., through a wired or wireless connection) to data collector 220. For example, a field technician with a laptop may travel to each SAM 120 (or to various locations in proximity to multiple SAMs 120) in the field to wirelessly collect the stored seismic energy data (e.g., stored on memory medium 640) from the SAMs 120. In some embodiments, the technician may retrieve memory mediums 640 from the SAMs 120 and/or may retrieve the SAMs 120 for data collection. In some embodiments, the memory mediums 640 and/or SAMs 120 may be replaced with other memory mediums 640/SAMs 120 to allow data collection to continue. In some embodiments, data collection from the seismic receivers 100 may not be discontinued during data collection from the SAMs 120. In some embodiments, stored seismic energy data, status information 675, timestamp 685, clock data 690, and/or positional information 695 may be collected.

At 1115, the data may be received at main data collector 230. For example, the seismic energy data may be transmitted (e.g., wirelessly) to main data collector 230 or may be provided to main data collector 230 from another data collector 220 (e.g., from a laptop that has collected the data in the field from the respective SAMs 120). In some embodiments, memory mediums 640 and/or SAMs 120 may be connected to main data collector 230 for data transfer to the main data collector 230.

At 1117, the received seismic energy data may be analyzed. Status information 675, timestamp 685, clock data 690, and/or positional information 695 may also be used in the analysis. For example, timestamps 685 and clock data 690 may be used to temporally align data samples from different seismic receivers 100 and/or streamers 140 and patterns may be analyzed to determine the presence and/or characteristics (e.g., density, size, composition, etc.) of geological formations near seismic receivers 100. Using timestamps 685 and clock data 690 may enable data from multiple seismic receivers 100 and streamers 140 to be analyzed as if being analyzed in real time.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus, comprising:
an antenna module, wherein:
the antenna module comprises a wireless transmitter and a memory medium coupled to the wireless transmitter for storing digital seismic data,
the wireless transmitter is operable to wirelessly transmit at least a portion of the digital seismic data stored on the memory medium to a data collector, and
the memory medium is operable to receive the digital seismic data from each of a plurality of seismic receivers external to the apparatus, wherein at least two seismic receivers of the plurality are operable to detect seismic energy and convert the seismic energy into the digital seismic data for storage in the memory medium; and
an interface module removably coupled to the antenna module, wherein the interface module comprises a connector for coupling the apparatus to the plurality of seismic receivers;
wherein the memory medium is operable to receive from the at least two seismic receivers of the plurality of seismic receivers the digital seismic data through the interface module,
wherein the apparatus is configured to store the digital data received from the plurality of seismic receivers to the memory medium and to communicate to an external device for realtime review a selected portion of the digital data received from the plurality of seismic receivers, and
wherein, upon removal of the antenna module from coupling to the interface module, the antenna module is configured to retain at least a portion of the digital seismic data received from the each of the plurality of seismic receivers external to the apparatus.

2. The apparatus of claim 1, further comprising another connector for coupling the apparatus to the external device, and wherein the selected portion of the digital data is received from a selected one of the plurality of seismic receivers.

3. The apparatus of claim 1, wherein the connector is an Ethernet connector.

4. The apparatus of claim 1, further comprising:
a Global Positioning System (GPS) receiver within the antenna module, wherein the memory medium is further operable to store data received through the GPS receiver; and
a battery within the antenna module, wherein the battery within the antenna module is further operable to provide power to the antenna module and to receive power from the interface module.

5. The apparatus of claim 4, wherein the data from the GPS receiver comprises a timestamp, and wherein the timestamp is associated with data received from at least one seismic receiver.

6. The apparatus of claim 4, wherein the data from the GPS receiver comprises clock data used to synchronize data collection from at least one seismic receiver with data collected from other seismic receivers not coupled to the apparatus.

7. A system, comprising:
a wireless transmitter;
a memory medium coupled to the wireless transmitter; and
a plurality of seismic receivers communicatively coupled to a device comprising the memory medium and the wireless transmitter, wherein the plurality of seismic receivers is external to the device comprising the memory medium and the wireless transmitter;
wherein the plurality of seismic receivers are operable to detect seismic energy, convert the seismic energy to digital data for storage in the memory medium, and transmit the digital data to the device comprising the memory medium on a respective digital channel for each of the plurality of seismic receivers, and wherein the digital data is stored with a respective identifier to associate the digital data with a seismic receiver of the plurality of seismic receivers;
wherein the wireless transmitter is operable to wirelessly transmit at least a portion of the data stored on the memory medium to a data collector; and
wherein, upon removal of at least a portion of the device from coupling to the plurality of seismic receivers, the at least a portion of the device is configured to retain at least a portion of the digital seismic data received from the each of the plurality of seismic receivers.

8. The system of claim 7, further comprising a connector coupled to the memory medium for coupling the memory medium to a module, wherein the module is operable to couple to the plurality of seismic receivers and wherein the memory medium is operable to receive digital data, through the module, from at least two of the plurality of seismic receivers.

9. The system of claim 8, wherein the connector is an Ethernet connector, and wherein a respective identifier further comprises information identifying a streamer of a respective seismic receiver of the plurality of seismic receivers.

10. The system of claim 8, further comprising a Global Positioning System (GPS) receiver, wherein the memory medium is further operable to store data received through the GPS receiver.

11. The system of claim 10, wherein the data from the GPS receiver comprises a timestamp, and wherein the timestamp is associated with data received from at least one seismic receiver.

12. The system of claim 10, wherein the data from the GPS receiver comprises clock data used to synchronize data collection from at least one seismic receiver with data collected from other seismic receivers not coupled to the apparatus.

13. A method, comprising:
a plurality of seismic receivers detecting seismic energy;
the plurality of seismic receivers converting the seismic energy to digital data and transferring the digital data to an apparatus by way of a connector for communicatively coupling the plurality of seismic receivers to the apparatus;
the apparatus receiving the digital data from the plurality of seismic receivers;
the apparatus storing the digital data received from the plurality of seismic receivers;
the apparatus wirelessly transmitting at least a portion of the stored digital data to a main data station;
upon removal of at least a portion of the apparatus from coupling to the plurality of seismic receivers, retaining in the at least a portion of the device at least a portion of the digital seismic data received from the each of the plurality of seismic receivers;
receiving the digital data for the plurality of seismic receivers at the main data station;
analyzing at least a portion of the received digital data.

14. The method of claim 13, wherein wirelessly transmitting the at least a portion of the stored seismic energy data comprises wirelessly transmitting the at least a portion of the stored seismic energy data through a transmitter module communicatively coupled to the seismic receiver.

15. The method of claim 13, further comprising storing a timestamp from a GPS receiver, wherein the timestamp is associated with data received from a seismic receiver of the plurality of seismic receivers.

16. The method of claim 13, further comprising storing clock data from a GPS receiver, wherein the clock data is used to synchronize data collection from the seismic receiver with data collected from other seismic receivers.

17. The method of claim 13, further comprising transmitting status information associated with a seismic receiver of the plurality of seismic receivers.

18. The method of claim 13, wherein analyzing at least a portion of the received data comprises determining at least one characteristic of one or more geological formations near the plurality of seismic receivers.

19. The method of claim 13, further comprising wirelessly transmitting status information in a real-time mode during data gathering from the seismic receivers and wirelessly transmitting the stored digital data to the main data station at a subsequent time.

* * * * *